United States Patent
Yamada et al.

(10) Patent No.: US 6,338,620 B1
(45) Date of Patent: Jan. 15, 2002

(54) TIRE-VULCANIZING MACHINE

(75) Inventors: Masato Yamada; Nobuhiko Irie, both of Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/433,960

(22) Filed: Nov. 4, 1999

(30) Foreign Application Priority Data

Nov. 20, 1998 (JP) .......................................... 10-330591
Sep. 24, 1999 (JP) .......................................... 11-269755

(51) Int. Cl.⁷ .............................................. B29C 35/02
(52) U.S. Cl. ...................................... 425/34.1; 425/40
(58) Field of Search ........................... 425/28.1, 40, 47, 425/34.1

(56) References Cited

U.S. PATENT DOCUMENTS

| | | | |
|---|---|---|---|
| 4,515,541 A | 5/1985 | Salvadori | 425/47 |
| 4,804,318 A | 2/1989 | Fujieda et al. | 425/34.1 |
| 5,863,484 A | 1/1999 | Hasegawa et al. | 264/297.5 |

FOREIGN PATENT DOCUMENTS

| | | |
|---|---|---|
| EP | 0459375 A2 | 12/1991 |
| EP | 0510332 A2 | 10/1992 |
| EP | 0684126 A2 | 11/1995 |
| EP | 0718082 A2 | 6/1996 |
| JP | 62048512 A | 3/1987 |
| JP | 08174553 A | 7/1996 |
| JP | 08238626 A | 9/1996 |
| JP | 09029746 A | 2/1997 |

OTHER PUBLICATIONS

Database WPI Week 9931, Derwent Publications Ltd., AN 1999–365793; & JP 11–138555 A (Mitsubishi), May 25, 1999.

*Primary Examiner*—James P. Mackey
(74) *Attorney, Agent, or Firm*—Jacobson Holman, PLLC

(57) ABSTRACT

A tire-vulcanizing machine in accordance with the present invention comprises a base frame, a guide column erected on the base frame, an upper movable beam guided by the column so as to move up and down, and two connection/disconnection units for connecting or disconnecting the upper movable beam to or from tire mold assemblies disposed on both sides of the column, wherein both the tire mold assemblies are opened or closed simultaneously or individually.

2 Claims, 4 Drawing Sheets

TIRE-VULCANIZING MACHINE

BACKGROUND OF THE INVENTION AND RELATED ART STATEMENT

1. Field of the Invention

The present invention relates to a vulcanizing machine of a tire vulcanizing system for vulcanizing a tire, supplying an unvulcanized tire, vulcanizing a tire and discharging a vulcanized tire.

2. Description of Related Art

Normally, a tire-vulcanizing machine (press) has two tire molds on the right and left sides thereof so as to increase productivity, and employs a simultaneous mold press type vulcanizing process in which two tires are simultaneously vulcanized with the two tire molds. In the tire vulcanizing machine of the simultaneous mold press type like this, a press mechanism is mounted on a press body, and the right and left tire molds are adapted to be opened or closed at the same time.

However, in the conventional tire vulcanizing machine described above, since the right and left tire molds cannot be opened or closed individually, while no problem occurs when tires which are of the same kind and have the same vulcanizing time are produced, if the tires are of different kind and have vulcanizing times from each other, it is required to adjust an opening or closing operation of the molds for each tire. Therefore, it is difficult to produce the tires efficiently with the conventional tire vulcanizing machine, the conventional tire vulcanizing machine is not suitable for producing a wide variety of tires and for minimizing the stock of products as the member of types of tires to be produced is increasing in recent years.

On the other hand, it is possible to provide the conventional tire vulcanizing machine with an independent opening/closing unit for opening or closing the right and left molds independently, but this increases equipment costs and is economically disadvantageous.

OBJECT AND SUMMARY OF THE INVENTION

The present invention has been achieved in view of the above-mentioned problems associated with the conventional tire vulcanizing machine described above, and it is an object of the present invention to provide a tire vulcanizing machine which can produce a wide variety of tires and can produce the tire efficiently by using a mold opening/closing device of simultaneous mold press type.

In order to solve the problems of conventional machines, a tire vulcanizing machine in accordance with the present invention has a base frame, a guide column erected on the base frame, an upper movable beam guided by the column so as to move up and down, and at least two connection/disconnection units for connecting or disconnecting the upper movable beam to or from tire mold assemblies, wherein the tire mold assemblies disposed on opposite sides of the column are opened or closed simultaneously or individually.

As described above, the tire vulcanizing machine in accordance with the present invention has the base frame, the guide column erected on the base frame, the upper movable beam guided by the column so as to move up and down, and the two connection/disconnection units for connecting or disconnecting the upper movable beam to or from the tire mold assemblies. Therefore, it is possible to provide the tire-vulcanizing machine which does not reduce its availability even if the frequency of changing molds increases.

Further, the tire-vulcanizing machine in accordance with the present invention has the base frame, the guide column erected on the base frame, the two upper movable beam guided by the column so as to move up and down, and the two connection/disconnection units for connecting or disconnecting the upper movable beam to or from the tire mold assemblies, wherein the tire mold assemblies disposed on opposite sides of the column are opened or closed simultaneously or individually and each of the tire mold assemblies can be opened or closed individually by using a mold opening/closing unit of simultaneous mold press type. That is, the tire vulcanizing machine in accordance with the present invention can produce tires using a time period for vulcanization suitable for each mold and thus can respond to the production of a wide variety of tires, and further can produce tires more efficiently. Further, since the tire-vulcanizing machine in accordance with the present invention is provided with a press mechanism in the mold assembly itself, even though the right and left molds are independently operated, it is possible to eliminate the need for providing the machine with an independent opening/closing unit for opening or closing the right and left molds independently. This can reduce the facilities costs.

DETAILED DESCRIPTION OF THE PREFERRED EMBODIMENTS

Figure 1:
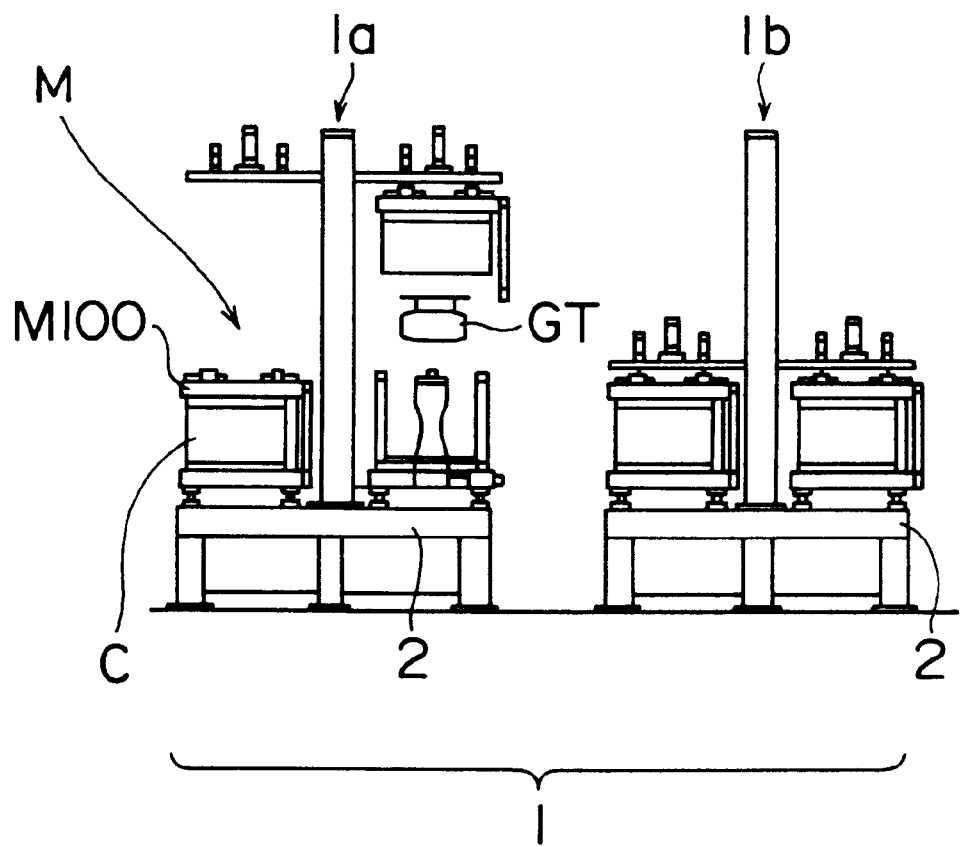
FIG. 1 is a front view showing a tire vulcanizing machine of the preferred embodiment in accordance with the present invention.

The present invention will hereinafter be described in detail on the basis of the preferred embodiments shown in the drawings. Here, FIG. 1 is a front view showing a tire vulcanizing machine of the preferred embodiment in accordance with the present invention, and FIG. 2 is a front view, on an enlarged scale, showing the tire vulcanizing machine of FIG. 1.

A tire vulcanizing machine 1 of the preferred embodiment in accordance with the present invention has a loader for an unvulcanized tire, an unloader for a vulcanized tire, a tire cooling unit arranged in alignment with a delivery position of the unloader, and an unloader for a cooled tire disposed at the cooling unit, all of which accompany the tire vulcanizing machine 1 and are not shown in the drawings. The cooled tire taken out by the unloader is transferred to a suitable place by a tire transfer conveyor arranged outside the drawing.

In a tire-vulcanizing machine 1a arranged at the left side in FIG. 1, a left side unit is in a state in which it is vulcanizing a tire and a right side unit is in a state in which it is being supplied with an unvulcanized tire GT. Also, in a tire vulcanizing machine 1b arranged at the right side, each unit is in a state in which it is vulcanizing a tire.

Figure 2:
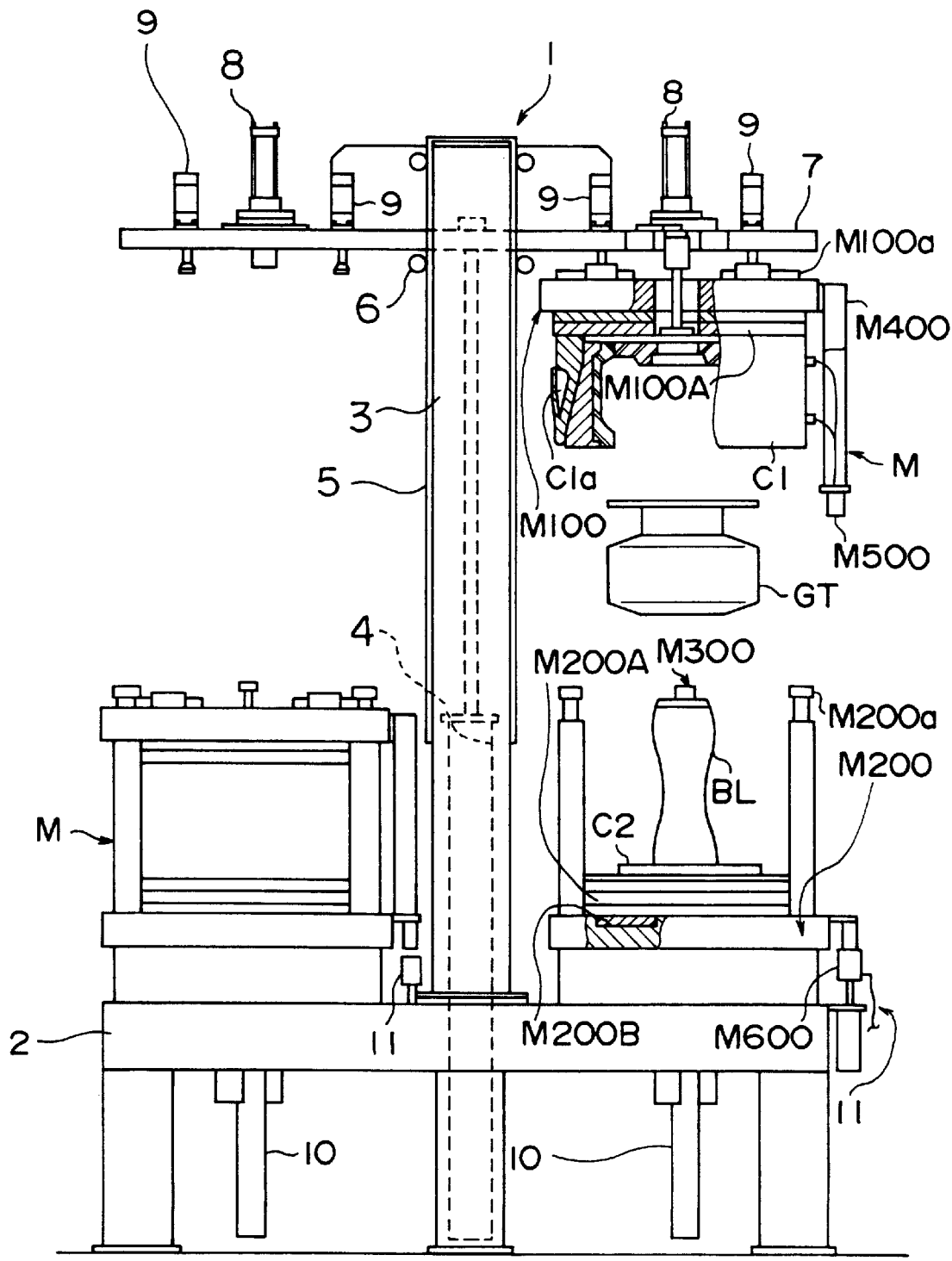
FIG. 2 is a front view, on an enlarged scale, showing a tire vulcanizing machine of FIG. 1.

The above-mentioned tire vulcanizing machine 1, as shown in FIG. 2, includes a column 3 erected at the center of an independently arranged base frame 2, an elevating cylinder 4 disposed in the column 3, an upper movable plate (upper movable beam) 7 movable in an up-and-down direction via guide rollers 6 sliding on guide rails 5 fixed to the column 3, a divisible mold operation unit 8 capable of being disconnected, connection/disconnection units 9 for connecting or disconnecting an upper plate assembly M100 of a tire mold assembly M to or from the upper movable plate 7, a bladder operation unit 10 for operating a bladder assembly M300 built-in the tire mold assembly M, a heating chamber C1a of a tire mold C of the tire mold assembly M, and a heating medium supply unit 11 for supplying a heating medium to an upper and a lower heating plates M100A, M200A, wherein the heating medium is supplied into a bladder BL from the bladder operation unit 10. In the above paragraph, the right side machine of the tire vulcanizing machine 1 has been described, and the left side machine thereof also includes the same units, assemblies, and plate as described above.

In this respect, for the detailed structure of the divisible-mold operation unit 8 described above, see Japanese Patent No. 18531, or a Japanese Examined Patent No. 5-62046 of the present applicant. Also, for the detailed structure of the connection/disconnection unit 9, see Japanese Unexamined Patent No. 9-29746 of the present applicant. Moreover, for the detailed structure of the bladder operation unit 10, see Japanese Unexamined Patent No. 8-238626 of the present applicant. Further, for the detailed structure of the heating medium supply unit 11, see Japanese Unexamined Patent No. 8-238626 of the present applicant. These documents are incorporated herein by reference.

On the other hand, the tire mold assembly M described above is made of the upper plate assembly M100, an upper half mold C1 and a lower half mold C2 of a well-known divisible mold C, a lower plate assembly M200, the bladder BL, the bladder assembly M300, a bracket M400 fixed to the upper plate assembly M100, a plurality of sets of check valves M500 for the upper heating plate M100A fixed to the upper plate assembly M100 and for the heating chamber C1a of the upper half mold C1, a pressure piston plate M200B provided in the lower plate assembly M200, and a special piston valve M600, which is fixed to a suitable portion of the lower plate assembly M200 (for its detail, see Japanese Application Patent No. 9-29746 of the present applicant, which is incorporated herein by reference), for a lower heating plate and an upper heating plate. That is, the tire mold assembly M is fixed on the base frame 2 and the mold thereof is replaced with a fork lift or the like.

In this respect, a right portion and a left portion of the upper movable plate 7 of the tire-vulcanizing machine 1 described above are moved up and down at the same time, but all the following units provided in each of the right and the left machines can be operated individually: the loader for the unvulcanized tire, and the unloader for the vulcanized tire, the tire cooling unit, the unloader for the cooled tire, all of which are not shown in the drawing, the divisible mold operation unit 8, the connection/disconnection unit 9 on the upper movable plate 7, the bladder operation unit 10, and the heating medium supply unit 11.

Now, a process for supplying the heating medium to the tire mold assembly M will be described in detail.

As described above, since the upper plate assembly M100 of the tire mold assembly M is not always connected to the upper movable plate 7 nor to the lower plate assembly M200 in the present preferred embodiment, it is a problem how to supply or recover the heating medium to or from the upper plate assembly M100 (the upper heating plate M100A and the heating chamber C1a of the upper half mold C1). In the tire vulcanizing machine of conventional simultaneous mold press type pressing the right side and the left side machines at the same time, the upper plate assembly M100 is always connected to the upper movable plate 7, and thus it is essential only that the heating medium introduced into the upper movable plate 7 through a hose or a swivel Joint be supplied to the upper plate assembly M100. However, in this structure, when the upper plate assembly M100 is disconnected from the upper movable plate 7 (that is, when the tire mold assembly M is closed), the heating medium cannot be supplied to the upper plate assembly M100, which results in a failure to perform a function as the tire-vulcanizing machine. Also, in the structure only for supplying the heating medium to the upper plate assembly M100 from the lower plate assembly M200 or for recovering it from the upper plate assembly M100, while the upper plate assembly M100 is separated from the lower plate assembly M200, the heating medium can not be supplied to or sealed in the upper plate assembly M100. Therefore, this produces a problem that the temperature in the upper plate assembly M100 can not be kept high and vulcanizing efficiency becomes reduced.

Figure 3:
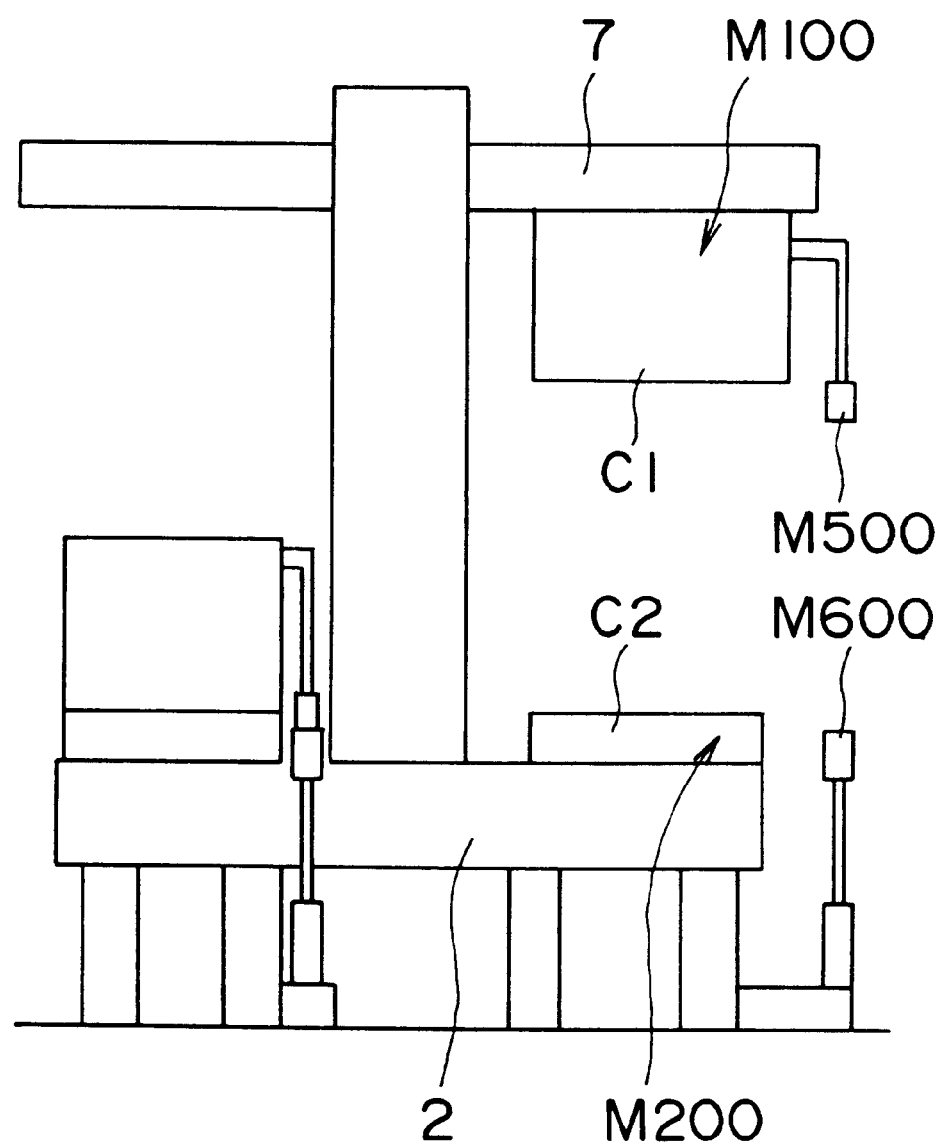
FIG. 3 is a front view, showing a structure for supplying or recovering the heating medium to or from the tire mold assembly of FIG. 1.

Accordingly, in the present preferred embodiment, as described above, the heating medium is supplied to the upper plate assembly M100 by the heating medium supply unit 11 mounted on the lower plate assembly M200, and while the upper plate assembly M100 is separated from the lower plate assembly M200, a passage for supplying or recovering the heating medium to or from the upper plate assembly M100 is closed to seal the heating medium in the upper plate assembly M100, as shown in FIG. 3. The supply or recovery passage described above is closed by the check valve M500. On the other hand, when the upper plate assembly M100 is disconnected from the lower plate assembly M200, the mother pipe side for the heating medium is closed by the special piston valve M600 connected to the check valve M500.

Figure 4:
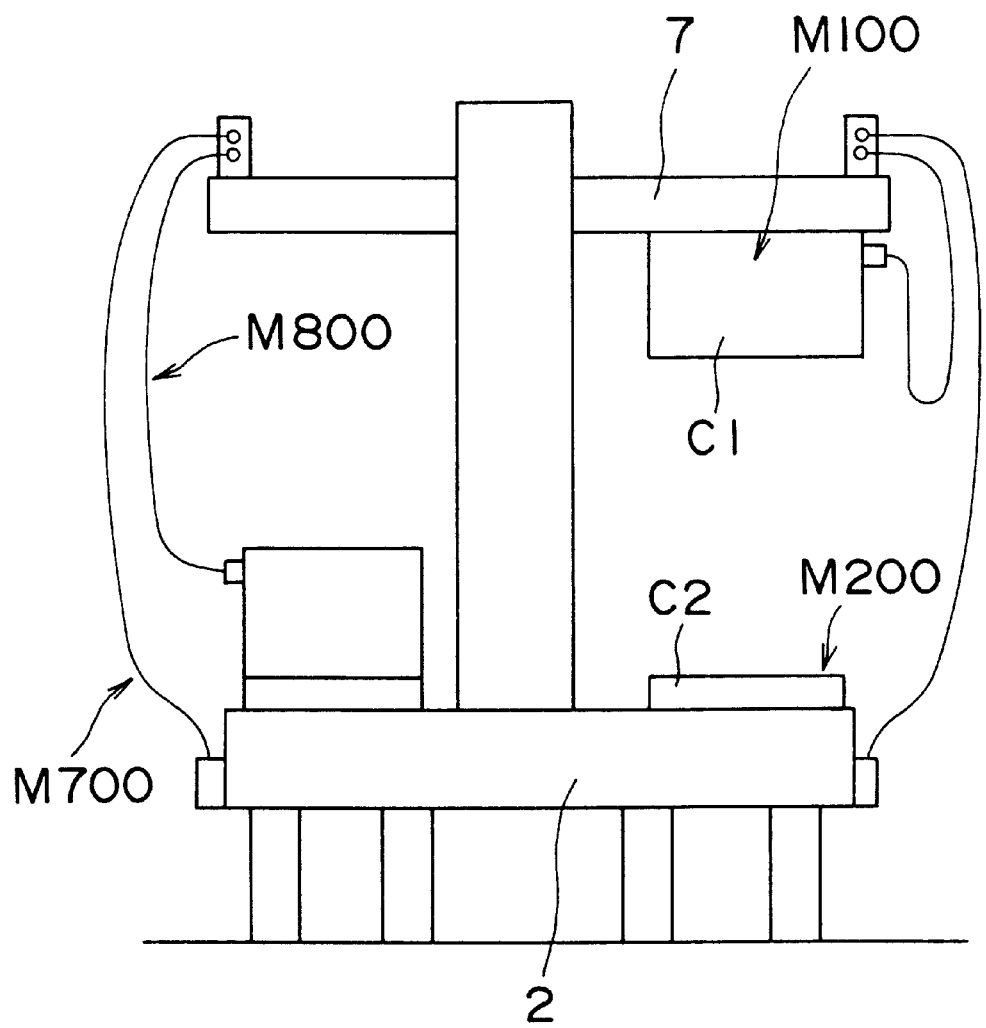
FIG. 4 is a front view, showing an other structure for supplying or recovering the heating medium to or from the tire mold assembly of FIG. 1.

In this regard, in addition to the structure described above, for example, a structure described below can be employed as a structure for supplying or recovering the heating medium to or from the tire mold assembly M, as shown in FIG. 4.

The heating medium is introduced into the upper movable plate 7 through a hose or a swivel joint (a first movable part) M700 and then is supplied or recovered to or from the upper plate assembly M100 via a hose or a swivel joint (a second movable part) M800 which has a length nearly equal to the travel of the elevating cylinder 4. If this structure is employed, even when the upper plate assembly M100 is disconnected from the lower plate assembly M200 and even when the upper movable plate 7 is separated from the upper plate assembly M100, the heating medium can continuously be supplied to the upper plate assembly M100, which can lead to a merit of preventing a decrease in the vulcanizing efficiency.

Next, the operation of vulcanizing the tire by using the tire vulcanizing machine 1 will be described with reference to FIG. 2.

(a) When the right tire mold C finishes the operation of vulcanizing, the heating pressurizing medium in the bladder BL is discharged via the bladder operation unit 10. During this discharging operation, the right divisible-mold operation unit 8 and the right connection/disconnection unit 9 which are disposed on the upper movable plate 7 are operated to connect the upper movable plate 7 to the upper plate assembly M100 on the mold assembly M, but the left divisible mold operation unit 8 and the left connection/disconnection unit 9 are not operated. Also, at the same time as the right connection/disconnection unit 9 performs a connection operation, a tie rod head portion M200a is disconnected from a connection plate M100a on the upper plate assembly M100 to be ready for opening the mold.

(b) When the piston rod of the elevating cylinder 4 is extended, the upper movable plate 7 is moved up with the upper plate assembly M100 and the upper half mold C1 of the mold assembly M. When the upper movable plate 7 is moved up, the divisible mold operation unit 8 performs a well-known operation to disconnect the tire mold C from a tire and moves up to a predetermined level. Then, as shown in FIG. 2, the upper half mold C1 is temporarily closed by the well-known operation of the divisible mold operation unit 8 and then a vulcanized tire is taken out and an unvulcanized tire is fed by the well-known operation.

Also, although the heating medium supply device 11 for the upper heating plate M100A and the heating chamber C1a is disconnected from the check valve M500 while the mold is arranged at an above position, the heating medium in the upper heating plate M100A and the heating chamber C1a is sealed therein by the check valve M500 to continue supplying heat thereto.

(c) When the unvulcanized tire is fed, the upper half mold C1 which is temporarily closed Is opened again by the divisible mold operation unit 8 and then the upper movable plate 7 is moved down to close the mold completely while provisionally forming the unvulcanized tire.

(d) After the mold is completely closed, when the connection plate M100a is driven by a drive unit (not shown), it is disconnected from the connection/disconnection unit 9, and at the same time, is connected to the tie rod head portion M200a of the lower plate assembly M200. Then, the heating pressurizing medium is supplied to the pressure piston plate M200B of the lower plate assembly M200 to pressurize the tire mold with a predetermined force, thereby fastening the mold with the force of the heating pressurizing medium in the bladder BL so that the mold is not opened.

(e) The unvulcanized tire GT is prepared and fed in the following way. When the right tire mold finishes a vulcanizing operation, the right loader of the unvulcanized tire (not shown grips the upper bead portion of the unvulcanized tire GT stored on the top portion of a base (not shown) for the unvulcanized tire and moves up to a suitable level and extends above the lower half mold C2 of the opened tire mold assembly M and then supplies the unvulcanized tire GT to the waiting bladder assembly M300.

Then, the above-mentioned base for the unvulcanized tire is moved from an unvulcanized tire delivering position to an unvulcanized tire unloading position and waits at the unvulcanized tire unloading position until it is supplied with the next unvulcanized tire GT by a midair carrier not shown. After the base for the unvulcanized tire receives the next unvulcanized tire GT, it moves again to the original unvulcanized tire delivering position and waits there until the loader (not shown) for the unvulcanized tire receives the next unvulcanized tire. The like operation is repeated in the like manner.

(f) When the vulcanizing operation comes near to the end, the cooled tire of the tire cooling unit (not shown) is taken out by the unloader of the tire cooling unit and is discharged to a tire delivery conveyor and the tire cooling unit prepares for the next vulcanized tire.

On the other hand, the unloader of the vulcanized tire (not shown) takes out the tire and places it on the tire cooling unit and starts cooling the tire after the well-known operation.

Although the preferred embodiment in accordance with the present invention has been described above, it is not intended to limit the present invention to the preferred embodiment described above, but the present invention can be modified or changed within the spirit and scope of the present invention.

What is claimed is:

1. A tire vulcanizing machine comprising:

a base frame;

a guide column erected on the base frame;

at least two tire mold assemblies disposed on opposite sides of the column;

upper movable beam guided by the column so as to move up and down, said upper moveable beam selectively connected to each tire mold assembly;

at least two connection/disconnection units for connecting or disconnecting the upper movable beam to or from either of said two tire mold assemblies disposed on opposite sides of the column wherein the tire mold assemblies are opened or closed simultaneously or individually;

each said tire mold assembly including an upper mold assembly and a lower mold assembly and when the tire mold assembly is closed, a heating medium supply unit provided on the lower mold assembly includes means for supplying a heating medium to the upper mold assembly, and when the tire mold assembly is opened and the upper mold assembly is separated from the lower mold assembly, the heating medium supply unit includes means for stopping the heating medium from being supplied to the upper mold assembly, with means for sealing the heating medium in the upper mold assembly.

2. The tire vulcanizing machine as claimed in claim 1, wherein said heating medium is supplied to the upper mold assembly by said heating medium supply unit via the upper movable beam, and when the upper movable beam is disconnected from the upper mold assembly and is separated therefrom, a second movable part of the heating medium supply unit is operated to supply the heating medium to the upper mold assembly.

* * * * *